United States Patent
Chang et al.

(10) Patent No.: US 10,260,768 B2
(45) Date of Patent: Apr. 16, 2019

(54) METHOD OF CONTROLLING WATER-PUMP OF AIR CONDITIONING SYSTEM

(71) Applicant: Chicony Power Technology Co., Ltd., New Taipei (TW)

(72) Inventors: Tse-Wen Chang, New Taipei (TW); Wen-Yen Cheng, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 11 days.

(21) Appl. No.: 15/628,642

(22) Filed: Jun. 21, 2017

(65) Prior Publication Data
US 2018/0238573 A1 Aug. 23, 2018

(30) Foreign Application Priority Data
Feb. 21, 2017 (TW) .............................. 106105809 A

(51) Int. Cl.
*F24F 11/00* (2018.01)
*G05D 23/12* (2006.01)
*F24F 11/30* (2018.01)
*F24F 11/64* (2018.01)
*F24F 11/62* (2018.01)
(Continued)

(52) U.S. Cl.
CPC .............. *F24F 11/30* (2018.01); *F24F 11/62* (2018.01); *F24F 11/64* (2018.01); *F24F 11/85* (2018.01);
(Continued)

(58) Field of Classification Search
None
See application file for complete search history.

(56) References Cited

U.S. PATENT DOCUMENTS 6,286,764 B1 * 9/2001 Garvey ................ G05D 7/0635
236/12.12
8,774,978 B2 * 7/2014 Higgins ................ G06Q 10/06
700/295
(Continued)

FOREIGN PATENT DOCUMENTS

CN 103259475 A 8/2013
JP 2008-109826 A 5/2008
(Continued)

OTHER PUBLICATIONS

Office Action dated Jul. 23, 2018 of the corresponding Taiwan patent application No. 106105809.

*Primary Examiner* — Ramesh B Patel
(74) *Attorney, Agent, or Firm* — Chun-Ming Shih; HDLS IPR Services

(57) ABSTRACT

A method of controlling a water-pump of an air conditioning system used in an active air conditioning water circulating system includes: detecting an environmental parameter and a load value of the active air conditioning water system actively; adjusting a flow rate of a water-pump of the active air conditioning water system according to a first control logic when the environmental parameter is less than a first pre-default parameter and the load value is less than a load threshold; and, adjusting the flow rate of the water-pump according to a first control logic when the environmental parameter is not less than the first pre-default parameter or the load value is not less than the load threshold. The present disclosed example can enhance a flow control capacity for different environmental statuses via controlling the flow rate in the different environmental status according to the different control logic.

13 Claims, 9 Drawing Sheets

(51) Int. Cl.
*F24F 11/85* (2018.01)
*F24F 140/12* (2018.01)
*F24F 110/10* (2018.01)
*F24F 110/12* (2018.01)
*F24F 110/20* (2018.01)
*F24F 110/22* (2018.01)
*F24F 140/50* (2018.01)

(52) U.S. Cl.
CPC .......... *G05D 23/12* (2013.01); *F24F 2110/10* (2018.01); *F24F 2110/12* (2018.01); *F24F 2110/20* (2018.01); *F24F 2110/22* (2018.01); *F24F 2140/12* (2018.01); *F24F 2140/50* (2018.01)

(56) References Cited

U.S. PATENT DOCUMENTS

| | | | | |
|---|---|---|---|---|
| 9,366,451 | B2* | 6/2016 | Guo | G06N 99/005 |
| 9,746,093 | B2* | 8/2017 | Peret | G06K 9/2027 |
| 2011/0301766 | A1* | 12/2011 | Higgins | G06Q 10/06 |
| | | | | 700/282 |
| 2012/0047888 | A1* | 3/2012 | Penev | F03G 6/065 |
| | | | | 60/641.15 |
| 2014/0202678 | A1* | 7/2014 | Goth | H05K 7/20772 |
| | | | | 165/287 |
| 2014/0216688 | A1* | 8/2014 | Shelnutt | F28F 13/06 |
| | | | | 165/104.13 |
| 2014/0229022 | A1* | 8/2014 | Deivasigamani | G05D 7/0629 |
| | | | | 700/282 |
| 2018/0231258 | A1* | 8/2018 | Armstrong | F24H 1/201 |

FOREIGN PATENT DOCUMENTS

| | | |
|---|---|---|
| TW | I315784 B | 10/2009 |
| TW | 201005231 A | 2/2010 |
| TW | I384341 B | 2/2013 |
| TW | 201631428 A | 9/2016 |
| TW | I569120 B | 2/2017 |

\* cited by examiner

METHOD OF CONTROLLING WATER-PUMP OF AIR CONDITIONING SYSTEM

BACKGROUND OF THE INVENTION

Field of the Invention

The technical field relates to a controlling method and more particularly related to a method of controlling a water-pump of an air conditioning.

Description of Related Art

A central air conditioning system of the related art usually comprises an air conditioning water circulating system for heat transportation. More specifically, the above-mentioned air conditioning water circulating system comprises an ice water host, a water-pump, and a plurality of extremity air heat exchanging devices respectively arranged in the different spaces if the air conditioning water circulating system is applicable to a purpose of cooling. The ice water host comprises a fluid compressor and a high/low water pressure heat exchanger, the ice water host is connected to the water-pump and the extremity air heat exchanging devices via pipes. After the ice water host starts up, the ice water host may control the fluid compressor to operate for generating ice water, and transport the generated ice water to each extremity air heat exchanging device via the water-pump. Each extremity air heat exchanging device comprises a fan device and a heat exchanger. Each extremity air heat exchanging device controls the fan device to start up for making the indoor return air take a hear exchange action with the heat exchanger and blow the cooling air cooled by the ice water into the indoor space arranged the extremity air heat exchanging device when the ice water is transported to the extremity air heat exchanging device. Thus, a room temperature of the indoor space arranged the extremity air heat exchanging device may be reduced.

Because the operating flow rate of the water-pump is rated for satisfying a maximum indoor load demand, for adapting the flow rate adjustment in the status of low load demand, most of air conditioning water circulating systems have been configured to execute a variable flow rate control mechanism based on a consideration of energy conservation currently. The above-mentioned variable flow rate control mechanism is implemented by configuring one of a plurality of control logics, such as control logic based on configuration of environmental temperature, control logic based on system water temperature difference or control logic based on water pressure difference of system.

However, each control logic has the different usage limitation and is respectively designed for the different application consideration with the different environmental condition. The air conditioning water circulating system of the related art is pre-configured to execute single control logic, and has no ability of switching to execute the most appropriate control logic according to the different environmental status and the different load status of system, such that the air conditioning water circulating system of the related art is not applicable on uniform application of the different environmental conditions and the different system load statuses.

SUMMARY OF THE INVENTION

The object of the present disclosed example is to disclose a method of controlling a water-pump of an air conditioning which has ability of switch to use the most appropriate control logic to control a flow rate of a water-pump according to the different environmental statuses and the different system load statuses.

One of the disclosed examples, a method of controlling a water-pump of an air conditioning applicable to an active air conditioning water circulating system, comprises: a) detecting an environmental parameter and a load value of the active air conditioning water system actively at the active air conditioning water circulating system; b) adjusting a flow rate of a water-pump of the active air conditioning water system according to a first control logic when the environmental parameter is less than a first preset parameter and the load value is less than a load threshold; and c) adjusting the flow rate of the water-pump according to a second control logic when the environmental parameter is not less than the first preset parameter or the load value is not less than the load threshold.

The present disclosed example can effectively enhance a flow control capacity of the active air conditioning water circulating system for different environmental statuses via controlling the flow rate of the water-pump in the different environmental status according to the different control logic.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
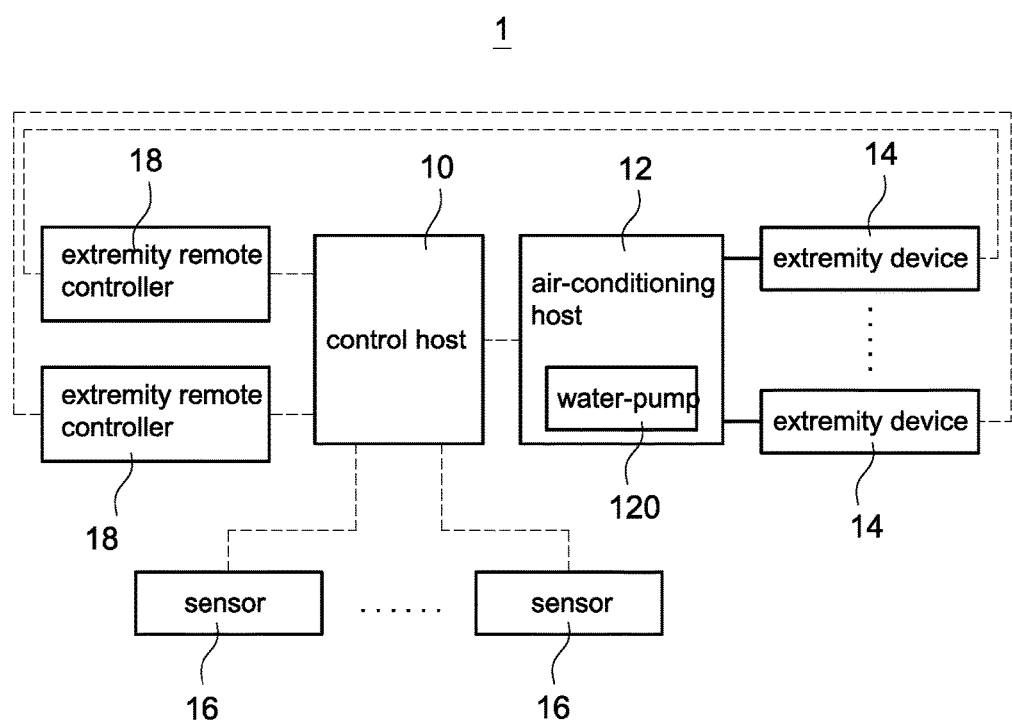
FIG. 1 is an architecture diagram of an active air conditioning water circulating system according to the first embodiment of the present disclosed example.

Please first refer to FIG. 1, which is an architecture diagram of an active air conditioning water circulating system according to the first embodiment of the present disclosed example. The present disclosed example discloses a method of controlling a water-pump of an air conditioning mainly applicable to an active air conditioning water circulating system 1 shown in FIG. 1.

The active air conditioning water circulating system 1 mainly comprises a control host 10, an air conditioning host 12, a plurality of extremity devices 14, a plurality of sensors 16 and a plurality of extremity remote controllers 18.

Figure 2:
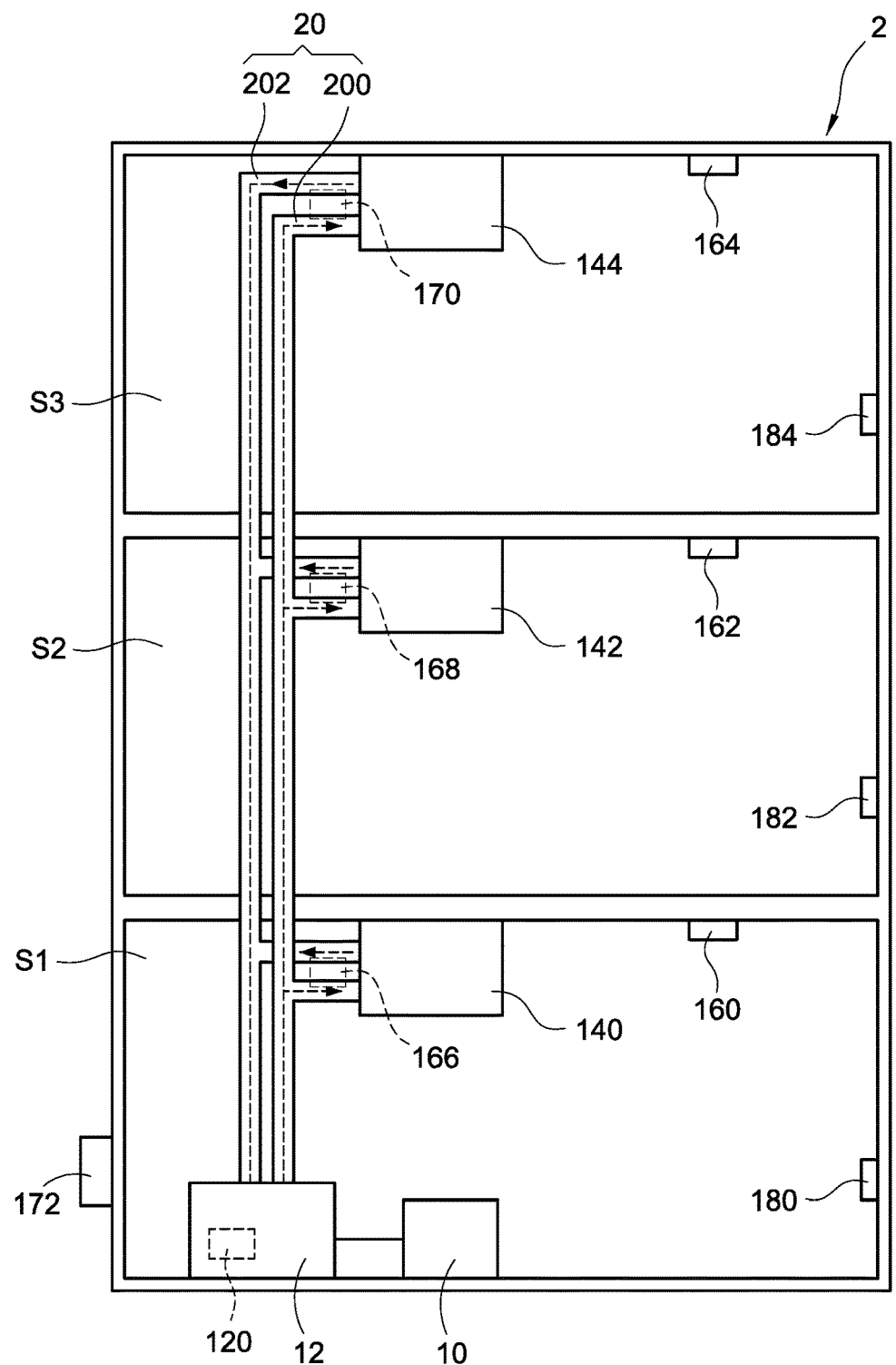
FIG. 2 is a schematic view of arrangement of an active air conditioning water circulating system according to the disclosed example.

The air conditioning host 12 comprises a water-pump 120, and is connected to each extremity device 14 via the water-pump 120 and water pipeline (indicated by solid lines in FIG. 2). The water-pump 120 may transport the temperature control fluid (such as water or the other fluid having high specific heat capacity, taking water for example in the following description) to each extremity device 14 via the water pipeline after starting up.

In one embodiment, the air conditioning host 12 further comprises a water tank, a heat exchanger, a thermostat device (such as ice water host, heat pump or boiler), a water-pump and a variable-frequency drive device (not shown in figures). The thermostat device may execute a thermostat process to the air conditioning circulating water (namely, the temperature control fluid) according to an air-conditioning-host-controlling signal sent from the control host 10 for reducing or raising the water temperature (taking reducing water temperature for example in the following description). Then, the air conditioning host 12 may control the water-pump 120 to operate with a specific rotating speed to transport the ice water to each extremity device 14 with the specific flow rate via the variable-frequency drive device according to above-mentioned air-conditioning-host-controlling signal sent from the control host 10.

Each extremity remote controller 18 is used to receive a user operation and sends a remote control signal corresponding to the received user operation to the extremity device 14. Each extremity remote controller 18 is electrically connected to the control host 10 and the corresponded extremity device 14 (such as the extremity device 14 arranged in the same space or the extremity device 14 paired with the extremity remote controller 18), so as to make the control host 10 have ability of controlling each extremity device 14 via each extremity remote controller 18. Each extremity device 14 may use the ice water to cool down the inhaled air, and then exhale the cooled air.

In one embodiment, the extremity device 14 comprises a fan device (not shown in figure), and the extremity device 14 adjusts a rotating speed of the fan device to increase or decrease a wind speed for increase or decrease the cooling rate of the indoor space according to the extremity-device-control signal.

In one embodiment, each extremity device 14 may receive a set of remote control signal from the corresponded extremity remote controller 18 (such as the extremity remote controller 18 arranged in the same space), and adjust a level of the water valve switch according to the received remote control signal for adjusting the flow rate of the temperature control fluid (such as water) to increase or decrease cooling rate.

Each sensor 16 is electrically connected to the control host 10, the sensor 16 is used to detect an environmental parameter of the environment (such as indoor space, outdoor space or pipeline) which the sensor 16 is arranged in, and sends the detected environmental parameter to the control host 10.

In one embodiment, the sensor 16 may be a thermometer (i.e. the environmental parameter is a temperature value), hygrometer (i.e. the environmental parameter is a humidity value), barometer (i.e. the environmental parameter is an air pressure value), piezometer (the environmental parameter is water pressure value) or any combination of above-mentioned sensors. Preferably, the sensor 16 may further calculate a wet-bulb temperature value, an enthalpy value or a dew point temperature value according to the detected temperature value, the detected humidity value and the detected air pressure value, and configure the calculated wet-bulb temperature value, the calculated enthalpy value or the calculated dew point temperature value as the environmental parameter.

The control host 10 is used to control the active air conditioning water circulating system 1 to operate. More specifically, the control host 10 may comprise a human-machine interface and a memory (not shown in figure). The human-machine interface is used to receive the user's operation. The memory is used to store a computer program used to implement each control logic (such as the average temperature control logic, the extremity status control logic and the water pressure difference control logic which are described later). The control host 10 may receive a plurality of environmental parameters from a plurality of sensors 16, retrieve a current load value of the air conditioning host 12, select one of the plurality of control logics according to the plurality of the environmental parameters and the current load value, load and execute the computer program corresponding to the selected control logic. Then, the control host 10 continually or intermittently sends the air-conditioning-controlling signal to the air conditioning host 12 based on the selected control logic for dynamically controlling the flow rate of water-pump 120 according to the current environmental parameter or the current load value.

Thus, the control host 10 may use the most appropriate control logic to control the flow rate of the water-pump according to the different environmental status and the different system load status.

Please refer to FIG. 2, which is a schematic view of arrangement of an active air conditioning water circulating system according to the disclosed example. The figure exemplifies a usage scenario of the active air conditioning water circulating system 1 according to the disclosed example. In the embodiment show in FIG. 2, each sensor 160-164 is a combination of thermometer and hygrometer. The sensors 166-170 are piezometers and respectively arranged in the head section, middle section and end section of the pipeline 20 for detecting the water pressure of each section of the pipeline. The building 2 forms three indoor spaces S1-S3. The control host 10, the air conditioning host 12, the extremity device 140, the sensor 160 and the extremity remote controller 180 are arranged in the indoor space S1. The extremity device 142, the sensor 162 and the extremity remote controller 182 are arranged in the indoor space S2. The extremity device 144, the sensor 164 and the extremity remote controller 184 are arranged in the indoor space S3. The sensor 172 is an enthalpy meter arranged outside of the building 2. The sensor 172 is used to detect the temperature value and the humidity value of the outside environment and calculates the corresponded enthalpy value.

The air conditioning host 12 may control the water-pump 120 to operation according to the air-conditioning-controlling signal sent from the control host 10, and transport the ice water to each extremity device 140-144 for making each extremity device have ability of adjusting the room temperature of the indoor space S1-S3 which each extremity device 140-144 is arranged in.

Furthermore, pipeline 20 comprises a set of water-providing pipes 200 used to transport the water from the air conditioning host 12 to each extremity device 140-144 and a set of water-returning pipes 202 used to transport the water from each extremity device 140-144 to the air conditioning host 12.

TABLE (1)

| environmental parameter | load value | |
|---|---|---|
| | less than load threshold | not less than load threshold |
| less than first preset parameter | first control logic | second control logic |
| not less than first preset parameter | second control logic | second control logic |

Figure 3:
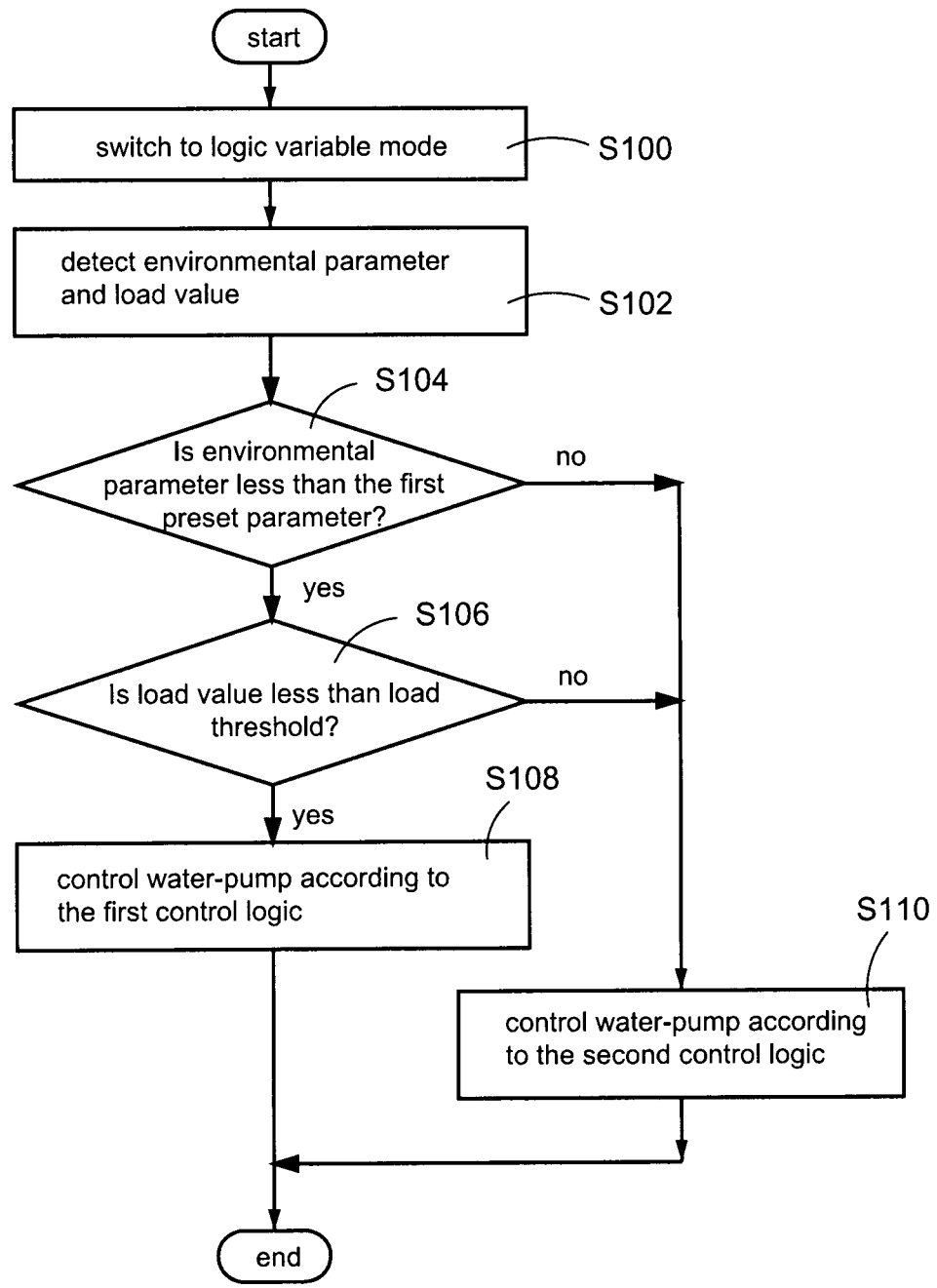
FIG. 3 is a flowchart of a method of controlling water-pump of air conditioning according to the first embodiment of the present disclosed example.

Please refer to FIG. 3 and table (1) together. FIG. 3 is a flowchart of a method of controlling a water-pump of an air conditioning according to the first embodiment of the present disclosed example, and table (1) is a schematic table of executing a control logic according to this embodiment. The methods according to various embodiments of the present disclosed example may be performed on the active air conditioning water circulating system shown in FIG. 1 or the active air conditioning water circulating system shown in FIG. 2. For clarity explaining, following description will take the active air conditioning water circulating system shown in FIG. 1 for explaining. In this embodiment, the active air conditioning water circulating system 1 may select the most appropriate control logic from two types of control logic according to environmental parameter and load value, and control the flow rate of the water-pump 120 according to the selected control logic. The method of controlling water-pump of air conditioning according to the first embodiment of the present disclosed example has following steps.

Step S100: control host 10 switches to a logic variable mode. More specifically, the control host 10 switches to the logic variable mode when receiving the user's operation, or switches to the logic variable mode when the current time is within a preset time interval, such as a time interval from 9 am to 6 pm every day.

Step S102: control host 10 receives form each sensor 16 the environmental parameter detected by each sensor 16, and detects the load value of the active air conditioning water circulating system 1.

In one embodiment, the control host 10 receives a temperature value and a humidity value of the outside environment from the sensor 16, calculates the enthalpy value according to the received temperature value and the received humidity value, and configures the calculated enthalpy value as the environmental parameter. The outside environment is outside of the space which the active air conditioning water circulating system 1 is arranged in (as the space which the sensor 172 is arranged in shown in FIG. 2).

In one embodiment, the control host 10 may receive multiple detection values (such as temperature value, humidity value and enthalpy value) from one or more sensors 16, and make the received detection values as above-mentioned environmental parameters.

In one embodiment, the control host 10 executes a total supply calculation to obtain above-mentioned load value according to a number of a plurality of operated extremity devices 14. More specifically, the control host 10 gathers a quantity of the extremity devices 14 that have been started up, calculates a ratio of the gathered quantity to a quantity of all the extremity devices 14, and configures the calculated ratio as the load value. In another embodiment, the control host 10 calculates a total ice water flow rate used by the plurality of the operated extremity devices 14, calculates a ratio of the calculated total ice water flow rate to a maximum ice water providing rate of the air conditioning host 12, and configures the calculated ratio as the load value.

In one embodiment, the control host 10 may further retrieve a current air conditioning load value of the active air conditioning water circulating system 1, and calculates a system load rate.

Step S104: control host 100 determines whether the received environmental parameter is less than a first preset parameter (such as 20 degrees Celsius if the environmental parameter is the temperature value, 60% if the environmental parameter is the humidity value or 42.4 kJ per kilogram if the environmental parameter is the enthalpy value) configured by the user in advance.

If the control host 10 determines that the environmental parameter is less than first preset parameter, the control host 10 executes a step S106. Otherwise, the control host 10 executes a step S110 described below.

In one embodiment, the environmental parameter comprises multiple detection values, such as temperature value and humidity value. Besides, the first preset parameter also comprises multiple detection thresholds, such as temperature threshold and humidity threshold. The control host 10 compares the same type detection value and detection threshold one by one, and executes the step S106 when all or more than half of the detection values are less than the detection thresholds. Otherwise, the control host 10 executes the step S110.

Step S106: control host 10 determines whether the retrieved load value is less than a load threshold (such as 60%) preset by the user.

If the control host 10 determines that the load value is less than the load threshold, the control host 10 executes a step S108. Otherwise, the control host 10 executes a step S110.

Step S108: control host 10 adjusts the flow rate of the water-pump 120 of the active air conditioning water circulating system 1 according to the first control logic.

In one embodiment, the first control logic is an average temperature control logic shown in FIG. 5 (described later), and the control host 10 may control the flow rate of the water-pump 120 of the air conditioning host 12 dynamically according to an average temperature of the indoor space, but this specific example is not intended to limit the scope of the present disclosed example.

If the control host 10 determines that the environmental parameter is not less than the first preset parameter in step S104, or determines that the load value is not less than the load threshold in step S106, the control host 10 executes the step S110: the control host 10 adjusting the flow rate of the water-pump 120 according to the second control logic.

In one embodiment, the second control logic is an extremity status control logic shown in FIG. 6 (described later), and the control host 10 may control the flow rate of the air conditioning host 12 dynamically according to the extremity device 14 in a worse status, but this specific example is not intended to limit the scope of the present disclosed example.

The present disclosed example can effectively enhance a flow control capacity of the active air conditioning water circulating system for different environmental statuses via controlling the flow rate of the water-pump dynamically in the different environmental status according to the different control logic.

TABLE (2)

| environmental parameter | load value | |
| --- | --- | --- |
| | less than load threshold | not less than load threshold |
| less than first preset parameter | first control logic | second control logic |
| not less than first preset parameter and less than second preset parameter | second control logic | second control logic |
| not less than second preset parameter | third control logic | third control logic |

Figure 4A:
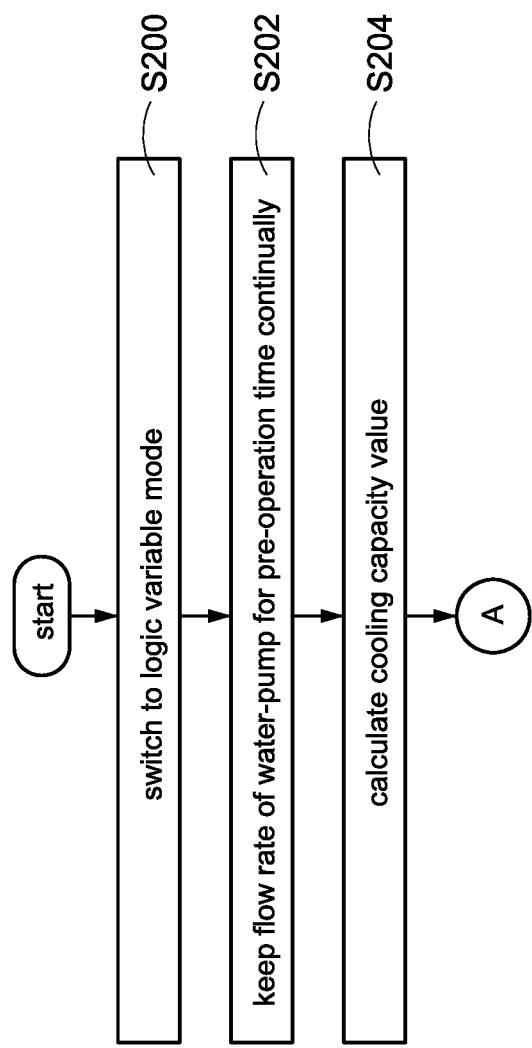
FIG. 4A is a first flowchart of a method of controlling water-pump of air conditioning according to the second embodiment of the present disclosed example.
Figure 4B:
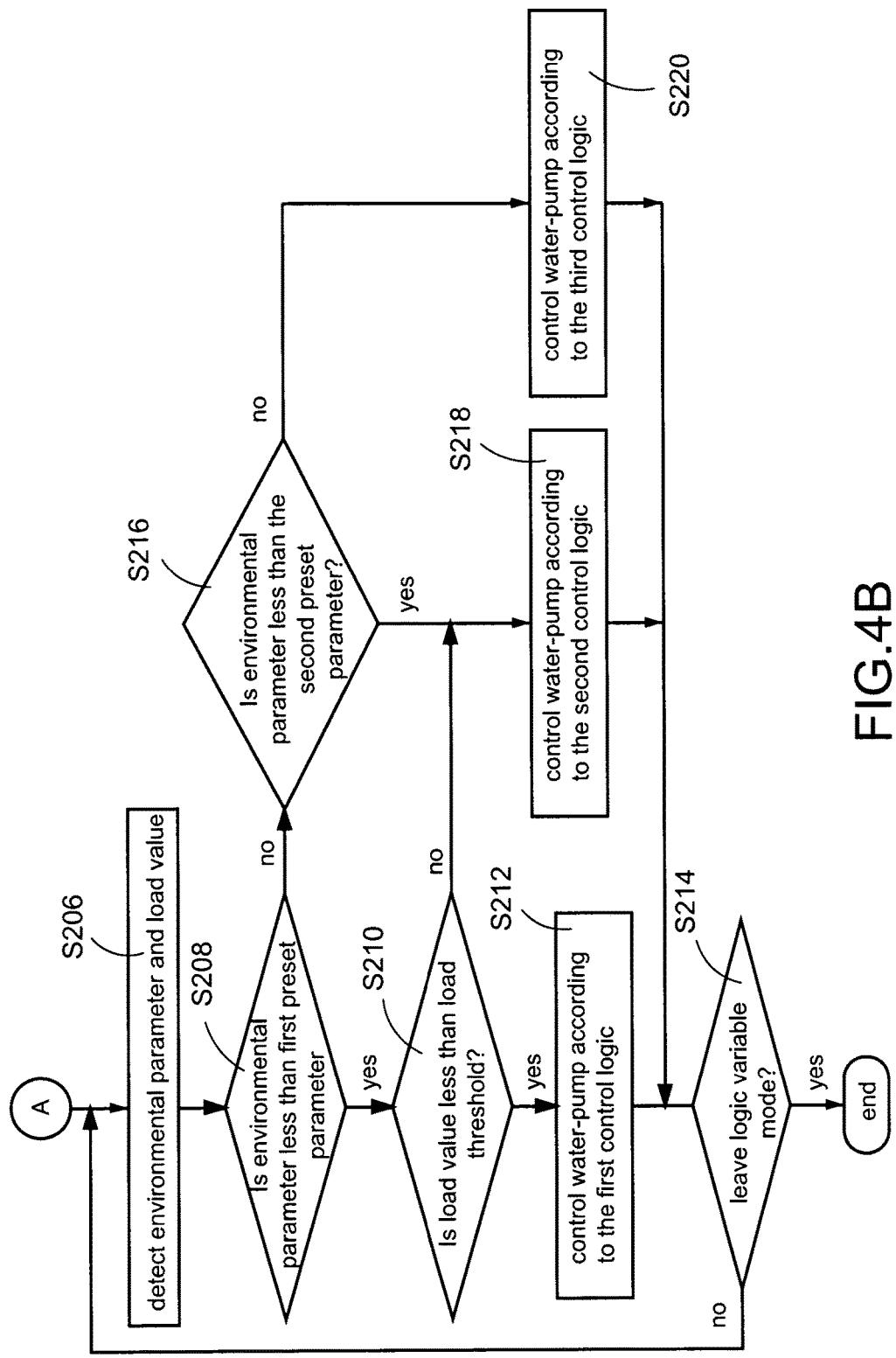
FIG. 4B is a second flowchart of a method of controlling water-pump of air conditioning according to the second embodiment of the present disclosed example.

Please refer to FIG. 4A, FIG. 4B and table (2) together. FIG. 4A is a first flowchart of a method of controlling a water-pump of an air conditioning according to the second embodiment of the present disclosed example, FIG. 4B is a second flowchart of a method of controlling a water-pump of an air conditioning according to the second embodiment of the present disclosed example, and table (2) is a schematic table of executing a control logic according to this embodiment. In this embodiment, the active air conditioning water circulating system 1 may select the most appropriate control logic from three type of control logic according to environmental parameter and load value, and control the flow rate of the water-pump 120 according to the selected control logic. The method of controlling water-pump of air conditioning according to the second embodiment of the present disclosed example has following steps.

Step S200: the control host 10 switches to the logic variable mode.

Step S202: the control host 10 controls the air conditioning host 12 to keep the flow rate of the water-pump 120 in a preset fixed flow rate value continually, and times a pre-operation time (such as 1 hour) via a timer. After the pre-operation time elapses, the control host 10 retrieves a providing/returning water temperature difference and a total circulating flow real-time measured by the air conditioning host 12.

Step S204: the control host 10 calculates a cooling capacity value of this operation according to the real-time measured flow rate and the real-time measured ice water temperature difference.

In one embodiment, the control host 10 first retrieves a rated cooling capacity value, calculates an actual cooling capacity value according to the preset flow rate and the calculates ice water temperature difference, and configures a ratio of the calculated actual cooling capacity value to the retrieved rated cooling capacity value as the cooling capacity value.

Step S206: the control host 10 retrieves the environmental parameter from each sensor 16, and detects the load value of the active air conditioning water circulating system 1.

Step S208: the control host 10 determines whether the received environmental parameter is less than the first preset parameter (such as 20 degrees Celsius if the environmental parameter is the temperature value, 60% if the environmental parameter is the humidity value or 42.4 kJ per kilogram if the environmental parameter is the enthalpy value) configured by user in advance.

If the control host 10 determines that the environmental parameter is less than first preset parameter, the control host 10 executes a step S210. Otherwise, the control host 10 executes a step S216.

Step S210: the control host 10 determines whether the retrieved load value is less than a load threshold (such as 60%) preset by the user.

If the control host 10 determines that the load value is less than the load threshold, the control host 10 executes a step S212. Otherwise, the control host 10 executes a step S218.

Step S212: the control host 10 adjusts the flow rate of the water-pump 120 of the active air conditioning water circulating system 1 according to the first control logic.

In one embodiment, the first control logic is an average temperature control logic, the control host 10 may adjust the flow rate of the water-pump 120 according to the first control logic and the cooling capacity value calculated in the step S204.

Step S214: the control host 10 determines whether the control host 10 leaves the logic variable mode, such as determining whether the user manually operates the system to make the system shutdown, leave the logic variable mode or turn off all extremity devices 14.

In one embodiment, the control host 10 executes the step S214 after operating according to any control logic for a preset time (such as six hours).

If the control host 10 determines that it must keep in the logic variable mode, the control host 10 executes the step S206 again for re-selecting the control logic most applicable to current environmental status. Otherwise, the method of controlling water-pump of air conditioning is ended.

Step S216: the control host 10 determines whether the received environmental parameter is less than a second preset parameter (such as 28 degrees Celsius if the environmental parameter is the temperature value, 65% if the environmental parameter is the humidity value or 64.7 kJ per kilogram if the environmental parameter is the enthalpy value) configured by the user in advance.

If the control host 10 determines that the environmental parameter is less than the second preset parameter, the control host 10 executes a step S218. Otherwise, the control host 10 executes a step S220.

In one embodiment, the environmental parameter comprises multiple detection values. Besides, the second preset parameter also comprises multiple detection thresholds. The control host 10 compares the same type detection value and detection threshold one by one, and executes the step S218 when all or more than half of the detection values are less than the detection thresholds. Otherwise, the control host 10 executes the step S220.

Step S218: the control host 10 adjusts the flow rate of the water-pump 120 according to the second control logic.

In one embodiment, the second control logic is an extremity status control logic, the control host 10 may control the flow rate of the air conditioning host 12 according to the second control logic and the cooling capacity value calculated in the step S204. Then, the control host 10 executes the step S214.

If the control host 10 determines that the environmental parameter is not less than the second preset parameter in the step S216, the control host 10 executes a step S220: the control host 10 adjusting the flow rate of the water-pimp 120 according to the third control logic.

In one embodiment, the third control logic is a water pressure difference control logic, and the control host 10 may control the air conditioning host 12 to adjust the flow rate of the water-pump 120 according to the water pressure difference of the pipeline dynamically, but this specific example is not intended to limit the scope of the present disclosed example.

In one embodiment, the control host 10 may adjust the flow rate of the water-pump 120 according to the third control logic and the cooling capacity value calculated in the step S204. Then, the control host 10 executes the step S214.

Figure 5:
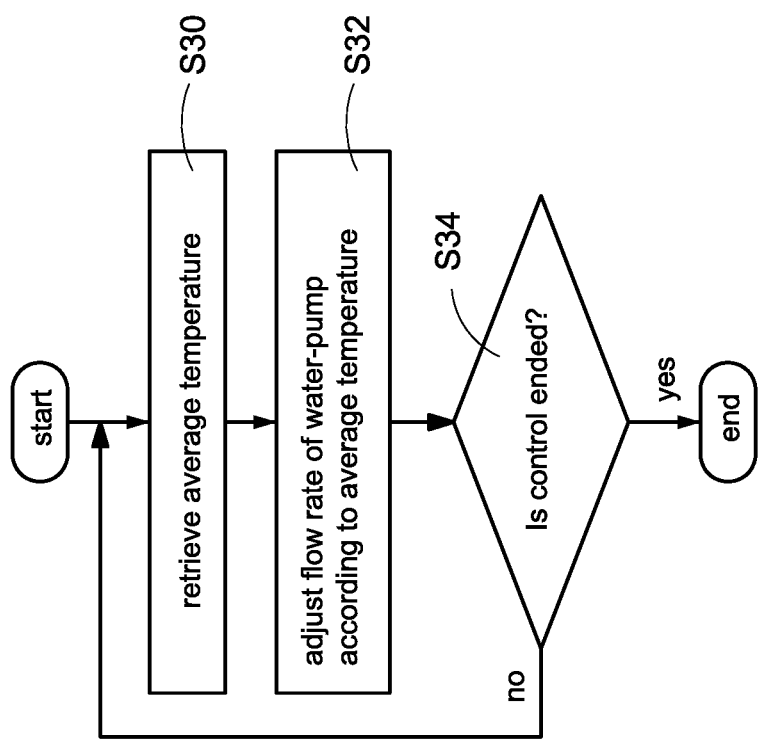
FIG. 5 is a flowchart of average temperature control logic according to the present disclosed example.

Please refer to FIG. 5, which is a flowchart of an average temperature control logic according to the present disclosed example. In this embodiment, the step S108 shown in FIG. 3 or the step S212 shown in FIG. 4B comprises following steps S30-S34.

Step S30: the control host 10 retrieves the average temperature (namely, environmental average temperature) of the plurality of the extremity device 14 of the active air conditioning water circulating system 1. More specifically, each extremity device 14 comprises a temperature sensor used to detect a return air temperature. The control host 10 receives the detected return air temperature from each extremity device 14, and calculated the average temperature of the plurality of return air temperatures (namely, average return air temperature).

Step S32: the control host 10 adjusts the flow rate of the water-pump 120 according to the calculated average temperature.

In one embodiment, the control host 10 retrieves a configuration average temperature configured by the user in advance, compares the average return air temperature with the configuration average temperature for obtaining a comparison result, and adjusts the flow rate of the water-pump 120 according to the comparison result.

Take the active air conditioning water circulating system 1 being a cooling system for example. The control host 10 may increase the flow rate of the water-pump 120 for reducing the room temperature when the average return air temperature is greater than the configuration average temperature. The control host 10 may reduce the flow rate of the water-pump 120 for increasing the room temperature when the average return air temperature is less than the configuration average temperature. The control host 10 may keep the flow rate of the water-pump 120 fixed for keeping the room temperature when the average return air temperature is equal to the configuration average temperature.

In one embodiment, the control host 10 adjusts the flow rate of the water-pump 120 according to the calculated cooling capacity value and above-mentioned comparison result. More specifically, if the higher the cooling capacity value is, the less the flow rate difference generated by the control host 10 is, and vice versa.

Step S34: the control host 10 determines whether the control is ended, such as the user shuts the system down or a preset execution time elapses.

If the control host 10 determines the control is continuous, the control host 10 executes the step S30 again. Otherwise, the control host 10 stops adjusting the flow rate of the water-pump 120.

Because the average temperature control logic is configured to control the flow rate of the water-pump 120 according to the average temperature of the indoor space dynamically, the average temperature control logic can effectively make the indoor temperature keep matching with the configuration temperature continually when the cooling resource of the active air conditioning water circulating system 1 is ample (namely, the system load is lower), and make the user feel comfortable.

Figure 6:
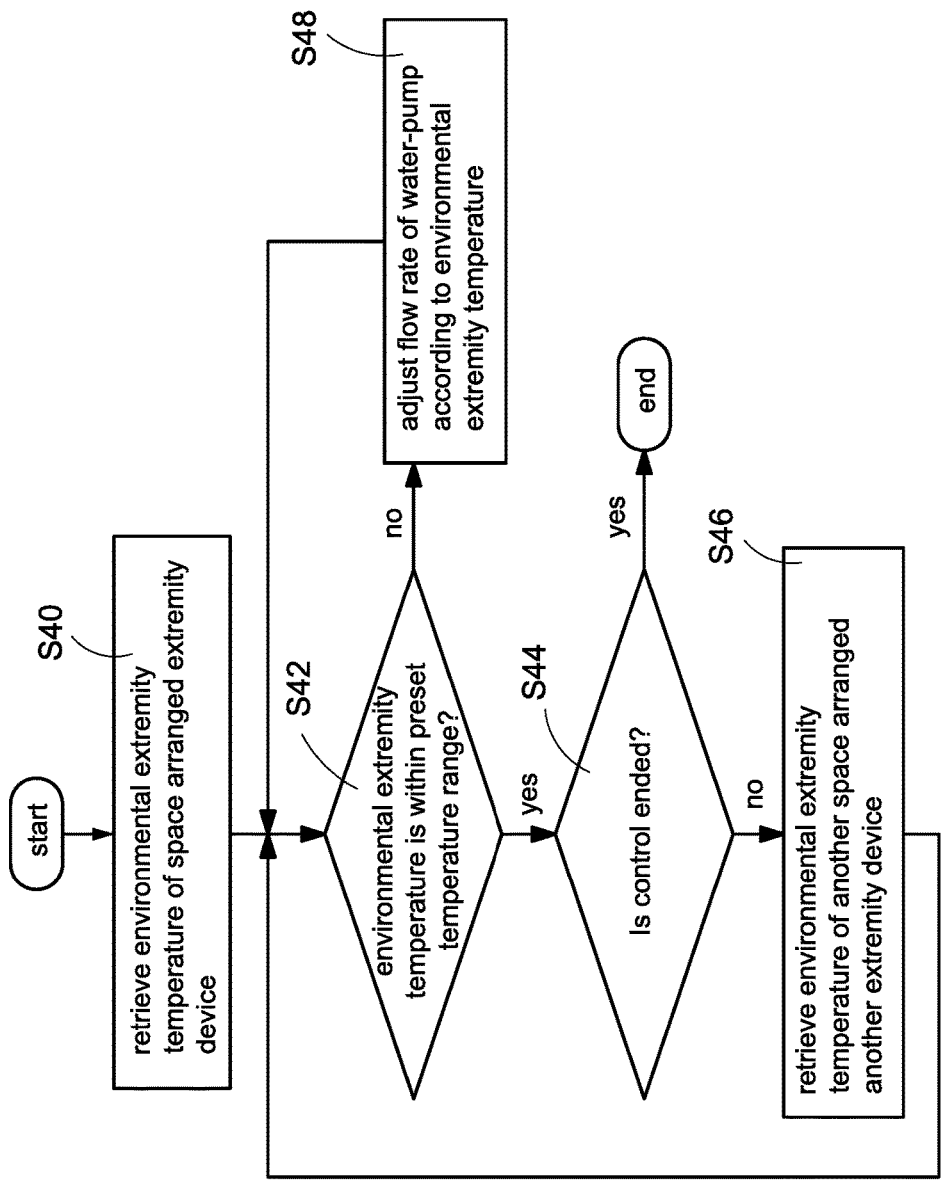
FIG. 6 is a flowchart of extremity status control logic according to the present disclosed example.

Please refer to FIG. 6, which is a flowchart of an extremity status control logic according to the present disclosed example. In this embodiment, the step S110 shown in FIG. 3 or the step S218 shown in FIG. 4B comprises following steps S40-S48.

Step S40: the control host 10 retrieves an environmental extremity temperature of a space which one of the extremity devices 14 of the active air conditioning water circulating system 1 is arranged in, namely, the environmental temperature of the space which the extremity devices 14 is arranged in. More specifically, the temperature sensors electrically connected to the control host 10 are respectively arranged in each space which each extremity device 14 is arranged in. The above-mentioned temperature sensor may detect the environmental extremity temperature of the space which the temperature sensor is arranged in, and send the detected environmental extremity temperature to the control host 10.

In one embodiment, the temperature sensor is arranged in the extremity remote controller 18. Besides, each extremity remote controller 18 and the extremity device 14 corresponding to the extremity remote controller 18 are arranged in the same space. Thus, the temperature sensor may detect the environmental extremity temperature of the space which the extremity device 14 is arranged in.

In one embodiment, the control host 10 retrieves the environmental extremity temperature of the pipe of the most unfavorable (worst) extremity device 14 (taking FIG. 2 for example, the control host 10 retrieves the environmental extremity temperature of the indoor space S3 which the extremity device 144 is arranged in), but this specific example is not intended to limit the scope of the disclosed example. In another embodiment, the user may configure the control host 10 to retrieve the environmental extremity temperature of any space which any extremity device 14 is arranged in as above-mentioned environmental extremity temperature.

Step S42: the control host 10 determines whether the retrieved environmental extremity temperature is within a preset temperature range configured by user in advance, such as the range from the temperature which increasing 3 degrees Celsius to a target temperature to the temperature which reducing 3 degrees Celsius to the target temperature, or the range from the temperature which increasing 3 degrees Celsius to an environmental extremity temperature of the space arranged the user-designated extremity device 14 to the temperature which reducing 3 degrees Celsius to the environmental extremity temperature.

Take it for example that the preset temperature range is the range from the temperature which increasing 3 degrees Celsius to the target temperature to the temperature which reducing 3 degrees Celsius to the target temperature. If the target temperature configured by the user is 25 degrees Celsius, the preset temperature range is from 28 degrees Celsius to 22 degrees Celsius. Take it for example that the preset temperature range is the range from the temperature which increasing 3 degrees Celsius to the environmental extremity temperature of the space arranged the user-designated extremity device 14 to the temperature which reducing 3 degrees Celsius to the environmental extremity temperature. If the environmental extremity temperature of the space arranged the user-designated extremity device 14 is 23 degrees Celsius, the preset temperature range is from 26 degrees Celsius to 20 degrees Celsius.

In another embodiment, the control host 10 may be configures to determine whether the retrieved environmental extremity temperature is matched with a preset temperature configured by the user in advance.

If the control host 10 determines that the retrieved environmental extremity temperature is within the preset temperature range, the control host 10 determines that a comfort status of the space arranged the extremity device 14 is good, and executes a step S44. Otherwise, the control host 10 determines that the comfort status of the space arranged the extremity device 14 is bad, and executes a step S48.

Step S44: the control host 10 determines whether the control is ended, such as the user shuts the system down or a preset execution time elapses.

If the control host 10 determines the control is continuous, the control host 10 executes the step S46 again. Otherwise, the control host 10 stops adjusting the flow rate of the water-pump 120.

Step S46: the control host 10 retrieves an environmental extremity temperature of another space arranged another extremity device 14.

In one embodiment, the control 10 retrieves the environmental extremity temperature of the space arranged the extremity device 14 secondary far from the air conditioning host 12. Taking FIG. 2 for example, the control host 10 retrieves environmental extremity temperature of the indoor space S2 arranged the extremity device 142, but this specific example is not intended to limit the scope of the present disclosed example. In another embodiment, the use may configures the control host 10 to retrieve the environmental extremity temperature of the space arranged any extremity device 14 as above-mentioned environmental extremity temperature. Then, the control host 10 executes the step S42 again for determining whether the comfort status of the space arranged the extremity device 14 is good.

If the control host 10 determines that the retrieved environmental extremity temperature is out of the preset temperature range, the control host 10 executes a step S48: the control host 10 adjusting the flow rate of the water-pump 120 according to the environmental extremity temperature.

In one embodiment, the control host 10 calculates a difference between the environmental extremity temperature and a closest edge (namely, the upper limit value or the lower limit value) of the present temperature range, and calculates the flow rate of the water-pump 120 according to the calculated difference. For example, if the active air conditioning water circulating system 1 is a cooling system, and the preset temperature range is from 24 degrees Celsius to 26 degrees Celsius. When the environmental extremity temperature is 31 degrees Celsius, the control host 10 may calculate the temperature difference (namely, 5 degrees Celsius, the difference between 31 degrees Celsius and 26 degrees Celsius), and increases the flow rate of the water-pump 120 for reducing the environmental extremity temperature according to the calculated difference. In other example when the environmental extremity temperature is 20 degrees Celsius, the control host 10 may calculate the temperature difference (namely, −4 degrees Celsius, the difference between 20 degrees Celsius and 24 degrees Celsius), and reduces the flow rate of the water-pump 120 for increasing the environmental extremity temperature according to the calculated difference. In other example when the environmental extremity temperature is 24 degrees Celsius, the control host 10 may determines that the environmental extremity temperature is within the preset temperature range, and keeps the current flow rate of the water-pump 120 for keeping the current environmental extremity temperature.

Because the extremity status control logic is configured to adjust the flow rate of the water-pump 120 dynamically according to the specific extremity device 14 (such as the extremity device 14 having the worst status or the extremity device 14 arranged in the most important indoor space), when the cooling resource has possible in lack of cooling resource (such as the system load is too high or the environmental temperature is too high), the extremity status control logic can effectively keep the environmental temperature of the space arranged the designated extremity device 14 keep within the preset temperature range continually, so as to make the indoor space corresponding to the extremity pipe provide the most comfort status.

Furthermore, when the extremity device 14 is worst (such as the extremity device having the farthest distance from the air conditioning host 12, or the extremity device arranged in the worst environment, namely, the probability of the extremity device being bad is highest) and the environmental extremity temperature of the space arranged the extremity device 14 is within the preset temperature range (namely, the room temperature of the indoor space corresponding to the extremity device 14 is matched with the target temperature configured by the user), the environmental extremity temperatures of the other extremity pipes usually are in line with user expectation (namely, the room temperatures of the indoor spaces arranged the other extremity devices 14 are not more than the target temperature configured by the user).

Figure 7:
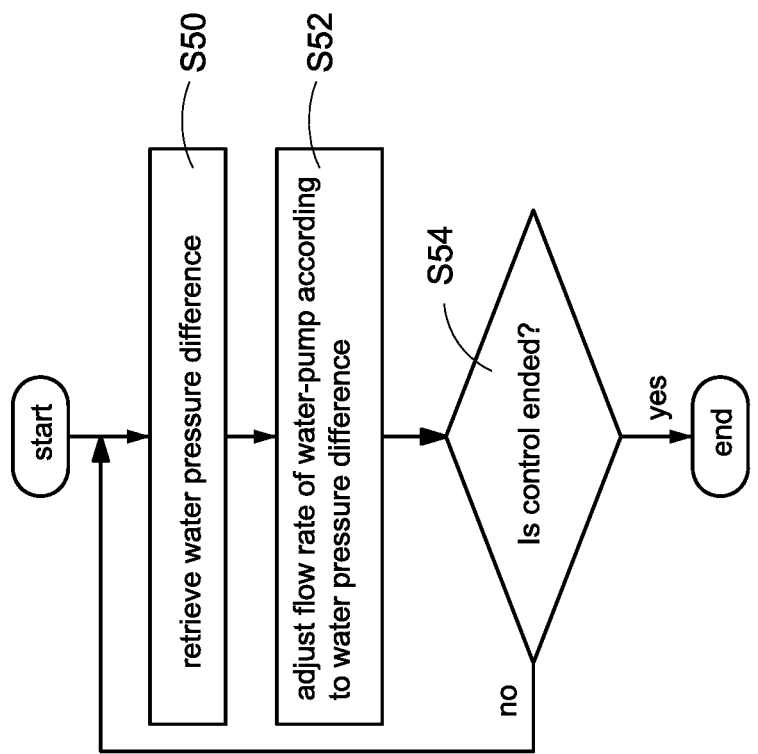
FIG. 7 is a flowchart of water pressure difference control logic according to the present disclosed example.

Please refer to FIG. 7, which is a flowchart of a water pressure difference control logic according to the present disclosed example. In this embodiment, the step S220 shown in FIG. 4B comprises following steps S50-S54.

Step S50: the control host 10 retrieves a water pressure difference of the active air conditioning water circulating system 1. More specifically, the water-providing pipes (such as the water-providing pipes 200 shown in FIG. 2) and the water-returning pipes (such as the water-returning pipes 200 shown in FIG. 2) are respectively arranged the piezometer electrically connected to the control host 10, so as to make the control host 10 have ability of detecting a water-providing pressure and a water-returning pressure via above-mentioned piezometer. The control host 10 may calculate the water pressure difference between the water-providing pressure and the water-returning pressure after retrieving the water-providing pressure and the water-returning pressure.

Furthermore, when the flow rate of the water-pump 120 increases, the water pressure difference between the water-providing pressure and the water-returning pressure increases too, and vice versa.

Step S52: the control host 10 adjusts the flow rate of the water-pump 120 for making the adjusted water pressure difference be within a preset water pressure difference range configured by user in advance according to the calculated pressure difference.

In one embodiment, the control host 10 adjusts the flow rate of the water-pump 120 according to above-mentioned water pressure difference. More specifically, if the water pressure difference is stably kept in the operating range continually, the variety of the flow rate of the water-pump 120 caused by the control host 10 adjusting is less, vice versa.

Step S54: the control host 10 determines whether the control is ended, such as the user shuts the system down or a preset execution time elapses.

If the control host 10 determines the control is continuous, the control host 10 executes the step S50 again. Otherwise, the control host 10 stops adjusting the flow rate of the water-pump 120.

Because the water pressure difference control logic is configured to adjust the flow rate of the water-pump 120 dynamically according to the water pressure difference between pipes, when the outside environmental status is bad (such as the temperature of outside environment is too higher), the water pressure difference control logic can effectively and simultaneously make the active air conditioning water circulating system 1 have the best temperature-adjusting capacity and prevent the system from overloading via keeping the water pressure difference between pipes being within a safety range.

Figure 8:
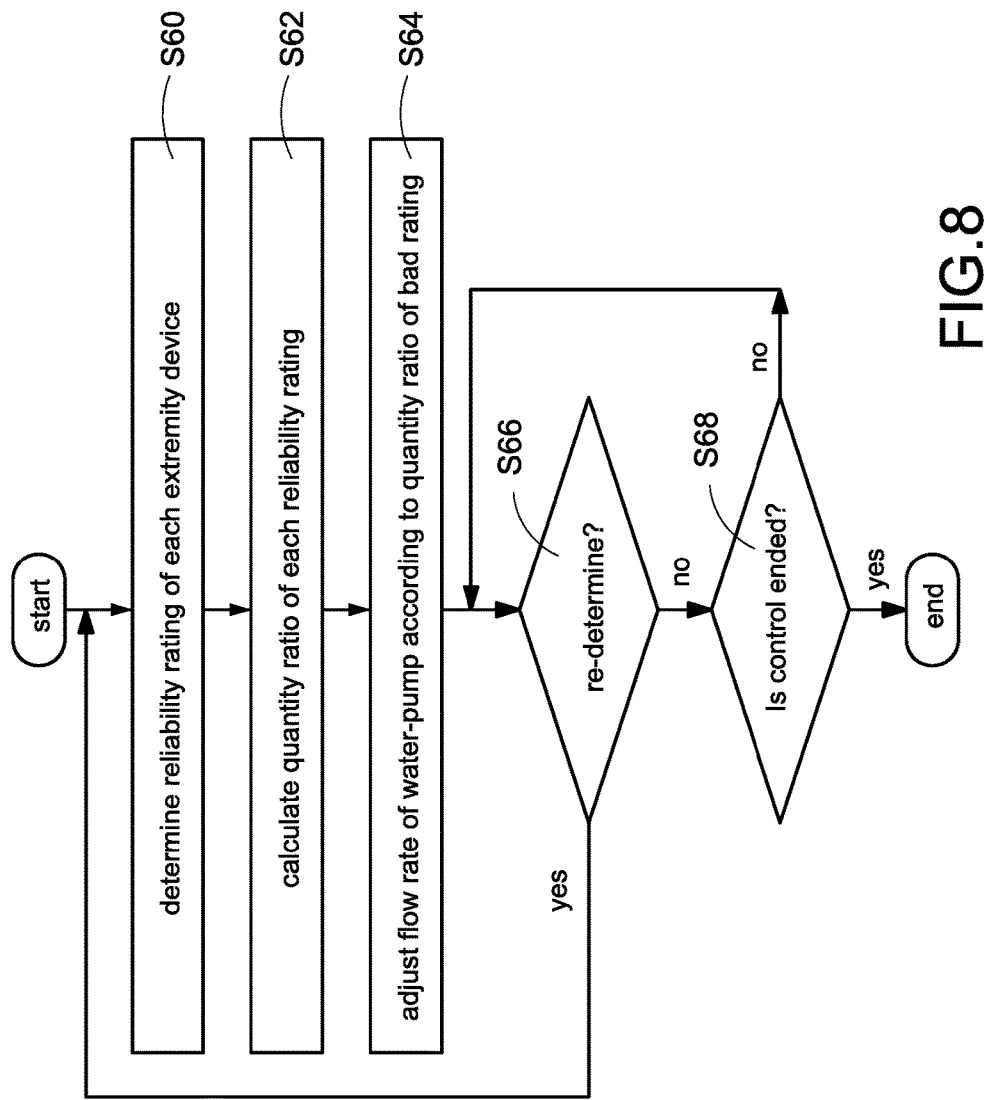
FIG. 8 is a flowchart of active correction mechanism according to the present disclosed example.

Please refer to FIG. 8, which is a flowchart of an active correction mechanism according to the present disclosed example. The present disclosed example further discloses an active correction mechanism based on reliability rating which has ability of correcting the current flow-rate of the water-pump 120 actively. The above-mentioned active correction mechanism may be executed simultaneously with the steps S100-S110 shown in FIG. 3 or the steps S200-S220 shown in FIG. 4A and FIG. 4B. Or, the active correction mechanism may be executed after the flow rate of the water-pump 120 is adjusted every time, but this specific example is not intended to limit the scope of the present disclosed example. The above-mentioned active correction mechanism comprises following steps S60-S68.

Step S60: the control host 10 receives a detection parameter and configuration parameter of each extremity device 14 from each extremity device 14, and determines a reliability rating of each extremity device 14 according to the received detection parameter and the received configuration parameter.

In one embodiment, the control host 10 configures the reliability rating to the first rating when a difference between the detection parameter and the configuration parameter is not less than a first threshold, configures the reliability rating to a second rating when the difference between the detection parameter and the configuration parameter is less than the first threshold and not less than a second threshold, and configures the reliability rating to the third rating when the difference between the detection parameter and the configuration parameter is less than the second threshold, wherein the first threshold is greater than the second threshold.

Taking FIG. 2 for example, the detection parameter may be the actual temperature detected by each extremity device 14 (such as return air temperature or room temperature), the configuration parameter may be the target temperature configured for the configuration parameter 14 by user (such as 25 degrees Celsius), the first threshold is "2", and the second threshold is "1". Besides, the detection parameters of three extremity devices 140-144 are 25 degrees Celsius, 26 degrees Celsius and 28 degrees Celsius respectively.

Then, the control host 10 may determine that the difference corresponding to the extremity device 140 is "0" and less than the second threshold (1), and determine that the reliability rating of the extremity device 140 is third rating (such as rating "usable"). The control host 10 may determine that the difference corresponding to the extremity device 142 is "1", is less than the first threshold (2) and is not less than the second threshold (1), and determine that the reliability rating of the extremity device 142 is second rating (such as rating "bad"). The control host 10 may determine that the difference corresponding to the extremity device 144 is "3", is not less than the first threshold (2), and determine that the reliability rating of the extremity device 144 is first rating (such as rating "very bad").

Step S62: the control host 10 gathers a quantity of the extremity devices 14 having the reliability rating matched with each rating statistically, and calculates a quantity ratio of the quantity of each reliability rating to a total quantity of the extremity devices 14 (such as total quantity of the operated extremity devices 14).

In one embodiment, each extremity devices 14 corresponds to a weight value respectively, and the control host 10 executes a weighted calculation according to weight value of each extremity devices 14 for calculating above-mentioned quantity ratio.

In one embodiment, the control host 10 gathers a first quantity of the extremity devices 14 having the reliability rating matched with a first rating statistically, gathers a second quantity of the extremity devices 14 having the reliability rating matched with a second rating statistically, and gathers a third quantity of the extremity devices having the reliability rating matched with a third rating statistically. Besides, the control host 10 calculates a first quantity ratio of the first quantity to the total quantity of all the (operated) extremity devices 14, calculates a second quantity ratio of the second quantity to the total quantity of all the (operated) extremity devices 14, and calculates a third quantity ratio of the third quantity to the total quantity of all the (operated) extremity devices 14.

Step S64: the control host 10 adjusts the flow rate of the water-pump 120 according to the quantity ratio of bad rating. More specifically, the user may configure some rating as the bad rating (such as configuring the first rating and the second rating as the bad rating). Then, the control host 10 adjusts the flow rate of the water-pump 120 according to the quantity ratio of bad rating (such as above-mentioned first quantity ratio and above-mentioned second quantity ratio).

In one embodiment, the control host 10 forcedly adjusts the flow rate of the water-pump 120 (such as increasing the flow rate) when the quantity ratio of the above-mentioned bad rating is not less than a preset ratio.

For example, the control host 10 adjusts the flow rate of the water-pump 120 when the first quantity ratio is not less than a first preset ratio (such as 5%) and/or the second quantity ratio is not less than a second preset ratio (such as 20%).

Step S66: the control host 10 determines whether the reliability rating of each extremity device 14 needs to be re-determined.

In one embodiment, the control host 10 determines the reliability rating of each extremity device 14 again after a preset time value (such as six hours) elapses or a preset time (such as the time interval from 9 am every day) comes.

If the control host 10 determines that the reliability rating needs to be re-determined, the control host 10 executes the step S60 again. Otherwise, the control host 10 executes a step S68.

Step S68: the control host 10 determines whether the control is ended, such as the user disables the active correction mechanism.

If the control host 10 determines the control is continuous, the control host 10 executes the step S66 again. Otherwise, the control host 10 finishes the active correction mechanism.

The present disclosed example can effectively detect whether the comfort status of the whole indoor space is bad, and correct the flow rate of the water-pump 120 actively when the comfort status is bad, so as to effectively enhance overall comfort.

Please be noted that although above-mentioned description takes the active air conditioning water circulating system being the cooling device (cooling system) for explaining, take the method of controlling water-pump of air conditioning being cooling control for explaining, but this specific example is not intended to limit the scope of the present disclosed example. The present disclosed example may be modified or enhanced without departing from the concepts of this present disclosed example according to the cooling or heating requirement of the person skilled in the art of the present disclosed example. For example, the active air conditioning water circulating system 1 may be modified to heating device (heating system), and the method of controlling water-pump of air conditioning is applied to heating control.

The above mentioned are only preferred specific examples in the disclosed example, and are not thence restrictive to the scope of claims of the disclosed example. Therefore, those who apply equivalent changes incorporating contents from the disclosed example are included in the scope of this application, as stated herein.

What is claimed is:

1. A method of controlling a water-pump of an air conditioning applicable to an active air conditioning water circulating system, comprising:
   a) detecting an environmental parameter and a load value of the active air conditioning water system actively at the active air conditioning water circulating system;
   b) adjusting a flow rate of a water-pump of the active air conditioning water system according to a first control logic when the environmental parameter is less than a first preset parameter and the load value is less than a load threshold, wherein the first control logic is an average temperature control logic and used to control the flow rate of the water-pump dynamically according to an average temperature; and
   c) adjusting the flow rate of the water-pump according to a second control logic when the environmental parameter is not less than the first preset parameter or the load value is not less than the load threshold, wherein the second control logic is an extremity status control logic and used to control the flow rate of the water-pump dynamically according to an environmental extremity temperature.

2. The method according to claim 1, wherein the step c) comprises:
   c1) adjusting the flow rate of the water-pump according to the second control logic when the environmental parameter is not less than the first preset parameter and less than a second preset parameter, or the environmental parameter is less than the first preset parameter and the load value is not less than the load threshold; and
   c2) adjusting the flow rate of the water-pump according to a third control logic when the environmental parameter is not less than the second preset parameter.

3. The method according to claim 2, wherein the step b) comprises:
   b1) retrieving a plurality of return air temperatures of a plurality of extremity devices of the active air conditioning water circulating system and calculating an average return air temperature according to the return air temperatures; and
   b2) comparing the average return air temperature with a configuration average temperature for obtaining a comparison result and adjusting the flow rate of a water-pump according to the comparison result continually when the environmental parameter is less than the first preset parameter and the load value is less than the load threshold.

4. The method according to claim 2, wherein the step c1) comprises:
   c11) retrieving the environmental extremity temperature of an extremity device of the active air conditioning water circulating system; and
   c12) determining whether the environmental extremity temperature is within a present temperature range or matches with a preset temperature continually when the environmental parameter is not less than the first preset parameter and less than the second preset parameter, or the environmental parameter is less than the first preset parameter and the load value is not less than the load threshold, calculating a difference between the environmental extremity temperature and a closest edge of the present temperature range or the preset temperature when determining the environmental extremity temperature is out of the preset temperature range, and adjusting the flow rate of the water-pump according to the difference.

5. The method according to claim 4, wherein the step c11) is performed to retrieve the environmental extremity temperature of a space arranged one of the plurality of the extremity devices; the step c1 further comprises a step c13) retrieving the environmental extremity temperature of another space arranged another extremity device when determining that the environmental extremity temperature of the space arranged the extremity device is within the preset temperature range, and executing the step c12) again.

6. The method according to claim 2, wherein the step c2) comprises:
   c21) detecting a water pressure difference of the active air conditioning water circulating system; and
   c22) adjusting the flow rate of the water-pump according to the water pressure difference continually for keeping the adjusted water pressure difference in a preset water pressure difference range when the environmental parameter is not less than the second preset parameter.

7. The method according to claim 1, wherein the step b) is performed to adjust the flow rate of the water-pump according to the first control logic and a cooling capacity value of the active air conditioning water circulating system, and the step c) is performed to adjust the flow rate of the water-pump according to the second control logic and the cooling capacity value, wherein the method of controlling water-pump of air conditioning further comprises following steps before the step b) and the step c):
   d1) keeping the flow rate of the water-pump in a fixed flow rate value continually for a pre-operation time, and retrieving an ice water temperature difference of the active air conditioning water circulating system in period of the pre-operation time; and
   d2) calculating the cooling capacity value according to the flow rate and the ice water temperature difference.

8. The method according to claim 7, wherein the step d2) is performed to retrieve a rated cooling capacity value, calculate an actual cooling capacity value according to the flow rate and the ice water temperature difference, and configure a ratio of the actual cooling capacity value to the rated cooling capacity value as the cooling capacity value.

9. The method according to claim 1, wherein the step a) is performed to execute a total supply calculation to obtain the load value according to a number of a plurality of operated extremity devices of the active air conditioning water circulating system.

10. The method according to claim 1, wherein the step a) is performed to calculate an enthalpy value of an outside environment outside of a space arranged the active air conditioning water circulating system as the environmental parameter.

11. The method according to claim 1, further comprising:
    e1) determining a reliability rating of each extremity device according to a detection parameter and a configuration parameter of each extremity device of the active air conditioning water circulating system;

e2) gathering a first quantity of the extremity devices having the reliability rating matched with a first rating statistically;

e3) calculating a first quantity ratio of the first quantity to a total quantity of the extremity devices; and e4) adjusting the flow rate of the water-pump according to the first quantity ratio.

12. The method according to claim 11, wherein the step e1) is performed to configure the reliability rating to the first rating when a difference between the detection parameter and the configuration parameter is not less than a first threshold, configure the reliability rating to a second rating when the difference between the detection parameter and the configuration parameter is less than the first threshold and not less than a second threshold, wherein the first threshold is greater than the second threshold.

13. The method according to claim 11, wherein the step e4) is performed to adjust the flow rate of the water-pump when the first quantity ratio is not less than a first preset ratio.

* * * * *